United States Patent [19]

Surauer et al.

[11] Patent Number: 5,697,582
[45] Date of Patent: Dec. 16, 1997

[54] METHOD OF ADJUSTING THE POSITION OF SATELLITES BY MEANS OF SOLAR PRESSURE TORQUES

[75] Inventors: Michael Surauer, Chieming; Helmut Bittner, Munich, both of Germany

[73] Assignee: Deutsche Aerospace AG, Munich, Germany

[21] Appl. No.: 146,036
[22] PCT Filed: May 7, 1992
[86] PCT No.: PCT/EP92/00995
§ 371 Date: Feb. 10, 1994
§ 102(e) Date: Feb. 10, 1994
[87] PCT Pub. No.: WO92/19498
PCT Pub. Date: Nov. 12, 1992

[30] Foreign Application Priority Data

May 7, 1991 [DE] Germany ............ 41 14 804.5

[51] Int. Cl.$^6$ ............................................. B64G 1/24
[52] U.S. Cl. ............................................. 244/168
[58] Field of Search ........................ 244/158 R, 164, 244/168, 173

[56] References Cited

U.S. PATENT DOCUMENTS

| | | | |
|---|---|---|---|
| 4,325,124 | 4/1982 | Renner | 244/173 X |
| 4,591,116 | 5/1986 | Guenther et al. | 244/173 X |
| 4,732,354 | 3/1988 | Lievre | 244/168 X |
| 4,747,567 | 5/1988 | Johnson et al. | 244/173 |
| 4,949,922 | 8/1990 | Rosen | 244/168 |
| 5,149,022 | 9/1992 | Flament | 244/168 |

FOREIGN PATENT DOCUMENTS

| | | |
|---|---|---|
| 0 195 553 | 9/1986 | European Pat. Off. . |
| 0 295 978 | 12/1988 | European Pat. Off. . |
| 0 372 434 | 6/1990 | European Pat. Off. . |
| 0 435 708 | 7/1991 | European Pat. Off. . |
| 2530046 | 1/1984 | France ............ 244/173 |
| 2 122 965 | 1/1984 | United Kingdom . |
| 92/09479 | 6/1992 | WIPO . |

Primary Examiner—Galen L. Barefoot
Attorney, Agent, or Firm—Evenson, McKeown Edwards & Lenahan, P.L.L.C.

[57] ABSTRACT

A method for adjusting the orientation and for compensating interfering torques via solar pressure torques for a satellite moving on an orbit around the earth. The satellite has two solar generators arranged symmetrically on opposite sides of a main body of the satellite. The two solar generators are rotatable independently of one another via servomotors about a first axis of rotation orthogonal to an orbiting plane of the satellite when the position of the satellite is correct. The method comprises the step of: optionally generating solar pressure torques about at least one of three space axes oriented orthogonally with respect to one another, as a result of an adjustment of the solar generators by a targeted rotation about second axes of rotation orthogonal to the first axis of rotation or about the first axis and the second axes of rotation, with respect to a nominal orientation in which the solar generator's normals to surfaces are precisely aligned in the direction of the sun.

13 Claims, 5 Drawing Sheets

METHOD OF ADJUSTING THE POSITION OF SATELLITES BY MEANS OF SOLAR PRESSURE TORQUES

BACKGROUND AND SUMMARY OF THE INVENTION

The invention relates to a method for adjusting the orientation of satellites and for compensating interfering torques by means of solar pressure torques. More particularly, a method is provided for a satellite which is equipped with two solar generators moving on an orbit around the earth. The solar generators are arranged symmetrically on opposite sides of the main body of the satellite. The solar generators can be rotated by means of servomotors independently of one another about a first axis of rotation respectively which is orthogonal to the orbiting plane when the orientation of the satellite is correct. The desired orientation of such satellites, for example, with respect to the earth, is a function of the satellites mission. The orientation is disturbed by asymmetries in the construction of the satellite, by superstructures on the main body of the satellite (such as antenna reflectors), and also by constructional tolerances, the migration of the center of gravity during the mission, residual magnetism and the like in interaction with environmental conditions (such as gravitational forces, the earth's magnetic field and solar pressure). In the case of satellites having a large geometrical dimension which are situated at a high altitude above the earth surface, such as communication satellites on geostationary orbits, mainly of decisive significance are interference forces and interfering torques which are caused by the radiation pressure of the sun.

It has been attempted in various manners to at least partially compensate the occurring interfering torques by the utilization of the solar pressure forces which originally caused the torques. Thus, it has, for example, been known for a long time that, by means of the adjustment in opposite directions of the two solar generators, which are arranged symmetrically to the main body of the satellite, a so-called "wind-mill torque" may be generated which acts about an axis which coincides with the intersection line of the plane of incidence of the sunlight with the plane of the satellite orbit. The direction of a thus produced torque vector migrates in the terrestrial orbit system with the permanent sun orientation of the solar generators because of the movement of the earth around the sun approximately one degree per day. In the rotating axes system of earth-oriented satellites, which rotate around the earth by 360° per orbit about an axis which is perpendicular to the orbiting plane, the line of effect of this wind-mill torque will rotate correspondingly in addition with the orbiting period of the satellite.

By means of a constant adjustment of the solar generators in opposite directions, those interfering influences whose creation is based on asymmetries of the solar generators themselves with respect to their axis of rotation and on deviations of their orientation from the desired direction, such as zero-point and positioning errors of the solar generator drives or torsions of the generator surfaces, caused by solar pressure, can be compensated in a simple manner. Interfering torques, which are caused by the solar pressure by way of deviations of the center of gravity, can be compensated by means of the above-mentioned adjusting measures only when the offset of the center of gravity is situated perpendicularly to the orbiting plane, that is, in the direction of the axis of rotation of the solar generators, and only in a time average by way of portions of the orbiting periods, but not when the displacement of the center of gravity is situated in the orbiting plane. This is normally the case because of the arrangement of the fuel tanks and their evacuation during the duration of the mission. For this reason and, in addition, because of the superposition of other interfering influences, the compensation is difficult and unreliable in practice.

For utilizing the solar pressure for producing adjusting torques for adjusting the position of satellites and for compensating interfering torques, devices and/or measures are therefore required which permit the generation of adjusting torques which act about several space axes. These space axes are preferably orthogonal with respect to one another and can be influenced and adjusted simultaneously and largely independently of one another.

Thus, for example, from U.S. Pat. No. 4,325,124, a method is known for the adjustment of the torque vector of an artificial satellite on a geostationary path of the initially mentioned type, in which the rotating movement of one of the two solar generators which are symmetrically arranged on the satellite is stopped for a certain time period. After its expiration, the rotating movement of the solar generator is caused to follow by the same amount beyond the nominal desired orientation when the measured roll deviation of the satellite exceeds a certain specified threshold value. As a result, it is achieved that in a time average, that is, during a period of such swivelling and holding cycles which are carried out in intervals symmetrically with respect to the direction of incidence of the sunlight, the solar generator surface, which is effectively subjected to the solar pressure, is reduced on one side. As a result, a mean solar pressure torque is created about a space axis which is situated in the orbiting plane and which is orthogonal with respect to the direction of incidence of the sunlight and thus to the line of influence of the above-described windmill torque.

This method was tested by experiments on the ESA-Satellite OTS 2 after the conclusion of its operational mission period (ESA-Bulletin 31, Page 75–79). Although it requires no additional equipment-related expenditures in comparison to equipping conventional satellites, it has the disadvantage that, simultaneously and unavoidably in the rhythm of the interval-type trailing and leading motion of the respective solar generator, windmill torques are generated which make impossible an influencing of the satellite movement about two space axes independently of one another. This parasitic coupling effect is quite considerable because the endeavored torque production about the lateral axis is proportional to the cosine of the deflection amplitude, that is, it changes with the amplitude in an approximation of only the second order and therefore becomes effective only in the case of relatively large deflections. In contrast, the windmill torque is proportional to the sine of the deflection and therefore rises linearly in a first approximation.

Furthermore, the mean surface reduction of the solar generator panel unit which is periodically moved back and forth is connected with a correspondingly high undesirable decrease of the obtainable electric power. In order to provide a specified electric power during the whole mission duration of, for example, 10 years or more in commercial geostationary communication satellites, relative to the start of the mission period, an overdimensioning of the solar cell surfaces by approximately 30% is required anyway since the efficiency of the solar energy production is impaired. This impairment is because of the seasonal fluctuation of the angle of incidence of the sunlight by ±23.44° (equator slope with respect to the ecliptic), the energy failure while passing through the earth's shadow, as well as aging effects, the contamination of the generator surfaces by cosmic dust, and the like. The additional power reduction during the application of the above-mentioned method must therefore be taken into account from the beginning by a corresponding enlargement of the solar generators, which results in disadvantages with respect to weight.

The basic conditions of the approximately linear or square dependence of the torques which can be produced in such a manner about the two space axes will also not change when, according to European Patent Document EP-A2 0 372 424 (corresponding to U.S. Pat. No. 4,949,922), not only one solar generator panel unit, but both panel units are adjusted simultaneously but to a different extent periodically with respect to the nominal sun orientation. Although this slightly reduces the influence of the coupling between the torques about the lateral axis and the windmill axis, this comes at the expense of a considerably higher loss of obtainable electric power which causes a further enlargement of the solar generators and corresponding disadvantages with respect to the weight and the volume in the case of a specified power requirement.

The problem of generating a solar pressure torque which can be adjusted independently of the windmill torque about two mutually orthogonal axes, may be solved according to European Patent Document EP-B10 101 333 by the mounting of additional solar sail which are arranged at fixed angles on the two sun generators and are used exclusively for the generation of adjusting torques. By means of additional surfaces, which are preferably provided on the tips of the solar generators antimetrically to their axes of rotation at an approximate right angle, while the rotation of the two sun generators takes place in the same direction, one of the two sun tilts is more intensely subjected to the radiation of the sun than the other. Thus, a torque is generated about an axis that is situated transversely to the direction of the incidence of the sunlight in the orbital plane of the satellite. This torque, in a first approximation, is proportional to the angle of rotation and to the solar sail surface.

According to a second embodiment of this invention, at the lower end of each solar generator, that is, close to the main body of the satellite, solar sails are respectively mounted which are situated symmetrically with respect to the axes of rotation and preferably form an angle of approximately 45° with the solar generator surface. These solar sails, while the solar generators are rotated in the same direction, from their sun orientation, cause a torque about a third space direction which coincides with their axes of rotation. The implementation of these two measures in one and the same satellite, however, is prohibited because otherwise, with the rotation of the two solar generator panel units in the same direction, solar pressure torques would always be generated which exclusively also have the same preceding signs and thus are strictly correlated with one another, about both above-mentioned space directions which are orthogonal with respect to the direction of the windmill torques. This makes an independent influencing for the purpose of the targeted position adjustment impossible. Although the additional solar sails may be designed in a relatively light, weight-saving construction because of the relatively low surface forces of the solar pressure, for this reason and because of the acute angle of incidence of the sunlight, large additional surfaces are required for generating significant adjusting torques which finally still cause a disadvantage with respect to weight and whose housing and unfolding result in an additional complexity and risks during the start of operation.

From German Patent Document DE-C2 33 29 955, an adjustment of the position of satellites is also known in which the solar generator surfaces subjected to the radiation pressure of the sun can be changed as a function of the adjusting of the position by an elastic bending deformation and torsional deformation. For this purpose, cables are fastened to the corners of the solar generators facing away from the satellite. The cables are connected crosswise on opposite corners of the main body of the satellite and are operated by a motor, or on cable winches mounted on turnstiles. It is obvious that the surface geometry of such solar generators, which consist of several segments and joints, are covered by solar cells and are necessarily inhomogeneous in their rigidity characteristics, such as in the case of an elastic bending deformation and a possibly simultaneous torsional deformation, is quantitatively very difficult to detect, and the position of the pressure point of the applied forces as well as of the resulting torques affecting the satellite are non-linear to a high degree, are intensely coupled and are therefore correspondingly difficult to master for a targeted use.

It is therefore the object of the present invention to provide, with additional expenditures that are as low as possible, an improved method for the effective utilization of the solar pressure for adjusting the orientation of satellites. The method causes no significant loss of electric power because of the seasonal fluctuation of the angle of incidence of the sunlight or because of control maneuvers, and at the same time permits an effective generating of adjusting torques about at least two space axes independently of one another. In addition, the method also permits a targeted influencing of the torque conditions about a third space axis. According to the present invention, this object is achieved by generating solar pressure torques optionally about at least one of three space axes, which are oriented orthogonally with respect to one another as a result of the fact that the solar generators, with respect to a nominal orientation ($\alpha_0$, $\beta_0$) in which their normals to the surfaces ($X_{PN}$, $X_{PS}$) are aligned precisely in the direction of the sun, are adjusted by a targeted rotation ($\epsilon_N$, $\epsilon_S$; $\gamma_N$, $\gamma_S$) about second axes of rotation which are orthogonal with respect to the first, or are adjusted about the first and the second axes of rotation.

It is true that a spacecraft is known from European Patent Document EP-A-0 195 553 which comprises two solar generators which are mounted on opposite sides and which can be swivelled independently of one another, not only about two, but even about three axes of rotation which are orthogonal with respect to one another. It can be achieved by corresponding rotations about two of these axes of rotation, that, as soon as this is desirable, the solar generators are turned completely toward the sun on their orbit around the earth. In this case, this corresponds to a nominal orientation in which the normals to the surfaces of the solar generators are aligned directly toward the sun. However, this swivelling capacity of the solar generators about at least a first as well as a second axis of rotation is not utilized for carrying out an adjusting of the orientation of the spacecraft by means of solar pressure torques. On the contrary, the adjusting of the orientation in the case of this known spacecraft is carried out in a manner that is completely autonomous with respect to the solar generator movements and is conventional.

In the case of many three-axes-stabilized satellites, the unfolding of the solar generators is carried out by means of prestressed springs by way of cables and deflection pulleys. However, mechanisms have also become known in which the unfolding is carried out by means of motor drives which are arranged in the lowest articulation of the solar generator which is closest to the main body of the satellite. Such already flight-tested unfolding drives of the latter type, which consist of redundant motor-transmission units which are fed from one of the also redundant current supply systems respectively, are installed, for example, in satellites of the EUTELSAT-2-Series. Particularly, mechanisms of the latter type may be enlarged without any major additional expenditures for the implementation of a signal-controlled solar generator adjustment about the above-mentioned two axes of rotation according to the present invention, for example, by providing a position feedback and omission of the locking in the end position.

For a better understanding, the important characteristics of the invention will be explained in the following by means of drawings, and the application possibilities for the purpose of adjusting the position of satellites and for compensating interfering torques by means of the physical regularities in the case of angular movements of solar generators about two axes of rotation with respect to the direction of the incidence of the sunlight will be discussed.

Other objects, advantages and novel features of the present invention will become apparent from the following detailed description of the invention when considered in conjunction with the accompanying drawings.

DETAILED DESCRIPTION OF THE DRAWINGS

Figure 1:
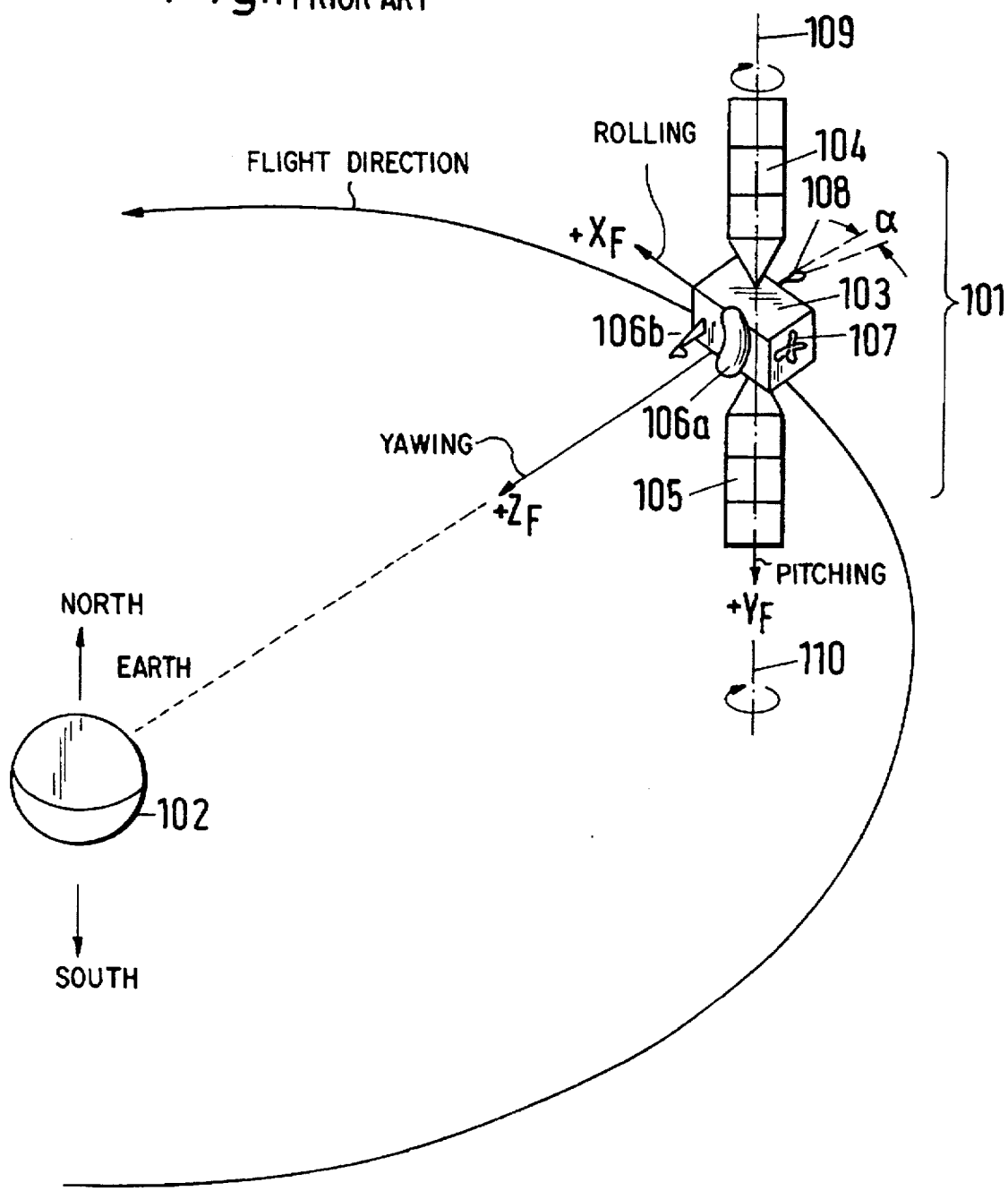
FIG. 1 is a schematic representation of a conventional type of satellite on a geostationary orbit.

FIG. 1 illustrates in a very simplified manner the typical geometric configuration of three-axes-stabilized satellites on an equatorial orbit around the earth 102. The satellite 101 consists of a cube-shaped central body 103 in which large-surface solar generators 104, 105, which are generally unfoldable, are disposed so that they can be rotated about first axes 109, 110 of rotation. The axes of rotation 109, 110 are orthogonal with respect to the orbiting plane. The satellite 101 carries one or more antennas 106a and feeding systems 106b aligned with the earth, whose beaming direction is to be kept within specified narrow limits by means of the adjusting system of the satellite. A system of axes $X_F$ (roll axis), $Y_F$ (pitch axis), $Z_F$ (yaw axis) is assigned to the satellite 101 in such a manner that, when the function of the adjusting system is ideal, the roll axis points in the momentary flight direction; the yaw axis points to the center of the earth; and the pitch axis points in the direction of the normal of the orbit. For generating external and/or internal adjusting torques about these axes, normally, depending on the construction and operational effective phase, different types of actuators are used which are not shown separately in FIG. 1. These actuators can be, for example, reaction nozzles 107, 108, or magnetic torque generators angular momentum storage devices, such as momentum wheels and reaction wheels.

Figure 2:
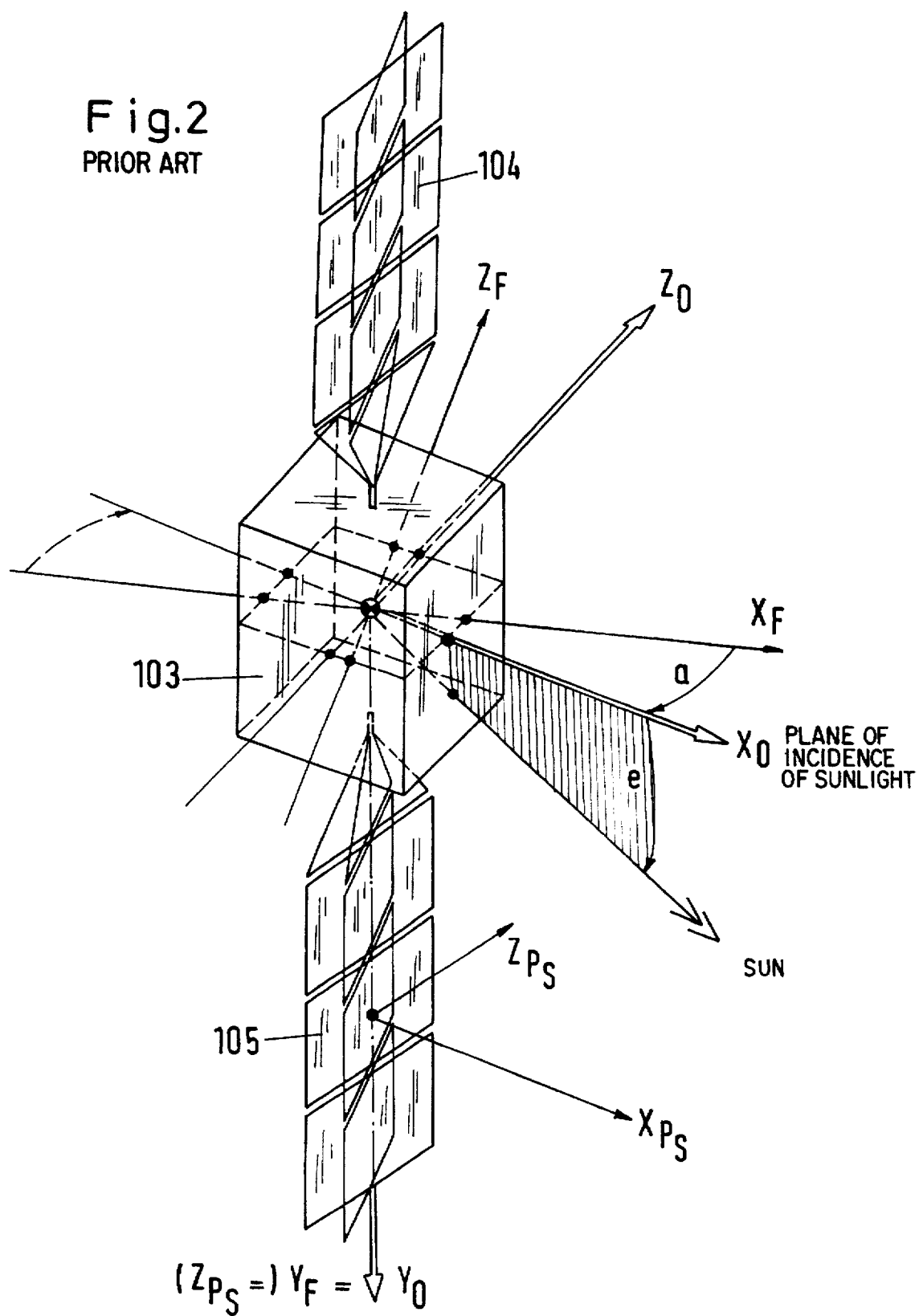
FIG. 2 is a simplified schematic representation of a conventional satellite for defining the coordinate systems.

By means of the schematic representation of a satellite according to FIG. 2, an additional system of coordinates is defined which has the axes $X_0$, $Y_0$, $Z_0$, and which refers to the desired orientation of the solar generators of conventional satellites in the direction of the plane of incidence of the sunlight and is rotated, with respect to the satellite-fixed (Index "F") earth-oriented system of axes, about the sun azimuth angle "a" in the orbiting plane. The sign preceding the angle (a) of rotation will be selected such that the satellite-fixed system of axes ($X_F$, $Y_F$, $Z_F$) in the case of a positive rotation (about the $Y_F=Y_0$-axis) changes to the quasi spaced-fixed system of axes ($X_0$, $Y_0$, $Z_0$) oriented in the direction of the plane of incidence of the sunlight.

Figure 3:
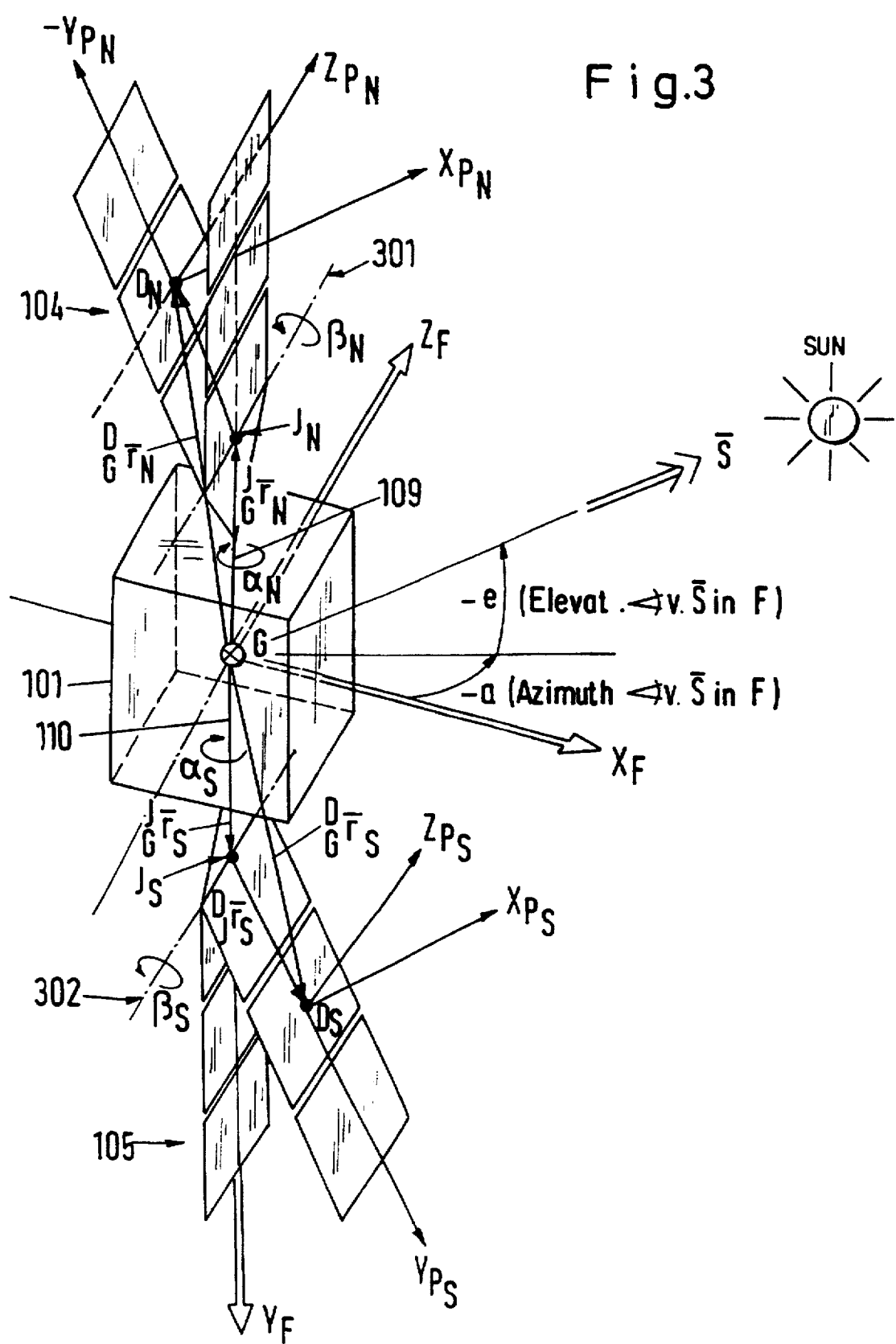
FIG. 3 is a schematic representation of a satellite with solar generators which, according to the present invention, can be adjusted about two axes of rotation which are orthogonal with respect to one another.

FIG. 3 illustrates a satellite according to the present invention, in the case of which each solar generator, in addition to being conventionally adjustable about a first axis 109, 110 which coincides with the vehicle-$Y_F$-axis, must also be adjustable by means of motor drives about second axes of rotation 301, 302 which are preferably arranged orthogonally with respect to the first axis. In this preferred embodiment, the above-mentioned two axes of rotation coincide with the connecting articulations between the connecting pieces called the "yoke" between the conventional solar generator drives and the solar generators which are covered by solar cells and normally consist of several sections which are folded together during the launch phase. So far, the drives for the above-mentioned unfolding mechanisms, which are particularly suitable for the implementation of the present invention and are driven by motors, have also been housed in these articulations. To each of the two solar generators (Index "P" for "Panel"), in the case of satellites in equatorial orbits on the north side (Index "N") and on the south side (Index "S"), another system of coordinates is assigned whose axes have the reference symbols $X_{PN}$, $Y_{PN}$, $Z_{PN}$ and $X_{PS}$, $Y_{PS}$, $Z_{PS}$. According to the agreement, the $X_P$-axes must always point in the direction of the normal to the active solar generator surfaces, and the $Z_P$-axes are to be situated in parallel with respect to the second axes of rotation.

In reference to FIG. 3,

G is the center of gravity of the satellite;

$\alpha_N/\alpha_S$ is the angle of rotation of the north-side or south-side solar generator (panel) about the respective first axis 109, 110 of rotation, in the case of earth-oriented satellites, the following being applicable: $0 \leq \alpha_P \leq 360°$;

$\beta_N/\beta_S$ is the angle of rotation of the north-side and south-side solar generator about the respective second axes 301, 302 of rotation, with $|\beta| \leq 23.44°$ in the case of geostationary satellites;

$D_N/D_S$ is the point of application of the resultants of the solar pressure forces (solar pressure point) acting upon the north-side and the south-side solar generator;

$J_N/J_S$ is the point of intersection of the first and the second axes of rotation of the north-side and south-side solar generator;

$\overrightarrow{G_N D_N} / \overrightarrow{G_S D_S}$ is the vector from the center of gravity of the satellite to the solar pressure point of the north-side and the south-side solar generator;

$$\frac{\bar{D}_{rN}}{J} \frac{\bar{D}_{rS}}{J}$$

is the vector from the point of intersection of the axes of rotation $J_N/J_S$ to the respective solar pressure point $D_N/D_S$;

$$\frac{\bar{J}_{rN}}{G} \frac{\bar{J}_{rS}}{G}$$

is the vector from the center of gravity of the satellite to the respective point of intersection of the axes of rotation $J_N/J_S$;

a, e are the azimuth angle and the elevation angle of the sun in satellite axes ($X_F$, $Y_F$, $Z_F$).

From the relevant technical literature (for example, J. R. Wertz: "Spacecraft Attitude Determination and Control", Page 570, and on,), it is known that the resultant of the forces acting upon a plane surface with homogeneous surface characteristics of size A by means of solar radiation can be represented by a force vector in the following form which is applied to the surface center:

$$\bar{f} = -P \cdot A \cdot (1-C_s)(\bar{n}^T \cdot \bar{s}) \cdot \bar{s} - 2 \cdot P \cdot A \cdot [C_s \cdot (\bar{n}^T \cdot \bar{s})^2 + (\frac{1}{3})C_d(\bar{n}^T \cdot \bar{s})] \cdot \bar{n} \quad (1.1)$$

or simplified:

$$\bar{f} = k_1 \cdot \bar{s} + k_2\{(\bar{n}^T \cdot \bar{s})\} \cdot \bar{n} \quad (1.2)$$

wherein:

$$k_1 = -PA(1-C_s)(\bar{n}^T \cdot \bar{s}) \quad (1.3)$$

$$k_2 = -2PA \cdot [C_s \cdot (\bar{n}^T \cdot \bar{s})^2 + (\frac{1}{3})C_d(\bar{n}^T \cdot \bar{s})] \quad (1.4)$$

P is the solar pressure ($4.5 \cdot 10^{-6} N/m^2$ in the environment of the earth);

A is the total surface of a solar generator;

$C_s$, $C_d$ are reflection coefficients, as a function of surface characteristics;

$\bar{n}$, $\bar{s}$ are unit vectors in the direction of the normals to the surface ($\bar{n}$) and of the direction of the incidence of the sunlight ($\bar{s}$);

$(\bar{n}^T \cdot \bar{s})$ is the scalar product between the above-mentioned unit vectors, and wherein $k_2 = k_2\{(\bar{n}^T \cdot \bar{s})\}$ is the functional dependence of the quantity $k_2$ on the scalar product.

According to an important characteristic of the present invention, in the nominal case, the normals to the surfaces of the solar generators at any point in time, that is, in any position of the satellite on its orbit and in any season, are always to be aligned with the sun. When the orbiting parameters of a satellite are known, accomplishing this is easily possible if the orbit does not extend in a circular manner and in the equatorial plane; that is, if the satellites are not geostationary, as in the present example, but are any application satellites, such as earth observation and scientific satellites on inclined orbits and with different orbital periods. Naturally, the degrees of the freedom of motion of the solar generators about the second axes of rotation must be coordinated with the mission requirements, that is, the type of orbit, particularly its inclination with respect to the elliptic. In this case, the above-mentioned scalar product $(\bar{n}^T \cdot \bar{S})$, which corresponds to the cosine of the enclosed angle in the case of small movements of the solar generators about their desired orientation, is, in a first approximation, equal to 1. The amount $k_2$ may be treated as a constant scalar factor.

By acting upon the servomotors for the movement of the solar generators, which are arranged, for example, on the north side (Index "N") and on the south side (Index "S"), about the first axes 109, 110 of rotation by means of signals in the form of $$\alpha_N(t) = \alpha_0(t) + \gamma_N(t) \quad (2.1a)$$

$$\alpha_S(t) = \alpha_0(t) + \gamma_S(t) \quad (2.1b)$$

and, for the movement about the second axes 301, 302 of rotation, by means of signals in the form of $$\beta_N(t) = \beta_0(t) + \epsilon_N(t) \quad (2.2a)$$

$$\beta_S(t) = \beta_0(t) + \epsilon_S(t) \quad (2.2b)$$

it is ensured that the normals to the surfaces point in a nominal manner, that is, in the undisturbed case, not only in the direction of the plane of incidence of the sunlight ($X_0Y_0$-plane in FIG. 2) as in the case of conventional satellites, but directly in the direction of the sun (unit vector "$\bar{s}$"). Additional signals $\gamma_N$, $\gamma_S$, $\epsilon_N$, $\epsilon_S$, which are to be used for generating solar pressure torques and adjusting torques, according to the invention, are to be superposed on this nominal orientation which has the symbols $\alpha_0$, $\beta_0$. According to FIG. 3, the desired orientation is ensured by the condition $$\alpha_0 = a \quad (2.3a)$$

$$\beta_0 = e \quad (2.3b)$$

Because of the large surfaces which are exposed directly to the solar pressure, small adjusting movements ($\gamma$, $\epsilon$) of the solar generators about their desired orientation ($\alpha_0$, $\beta_0$) are sufficient for generating sufficient adjusting torques so that, in the case of the application, for describing the regularities, approximations of the first order may largely be used and there is no resulting noticeable fluctuation of the solar energy production. By using the terms according to FIG. 3, the definition equations (2.1)–(2.3) above, and the assumption of a symmetrical configuration, the torques ($T_{OX}$, $T_{OY}$, $T_{OZ}$), which act upon the satellite, in the system of axes ($X_0$, $Y_0$, $Z_0$), which is aligned with the plane of incidence of the sunlight can in general be expressed as follows:

$$T_{OX} = \frac{D}{J} rk_1\{s^2\beta_0(s\gamma_N c\epsilon_N - s\gamma_S c\epsilon_S) + \quad (3.1)$$

$$s\beta_0 c\beta_0(s\gamma_N s\epsilon_N - s\gamma_S s\epsilon_S)\} + k_2 \left\{ \frac{D}{J} r(s\gamma_N - s\gamma_S) + \right.$$

$$\left. \frac{J}{G} r[c\beta_0(s\gamma_N c\epsilon_N - s\gamma_S c\epsilon_S) - s\beta_0(s\gamma_N s\epsilon_N - s\gamma_S s\epsilon_S)] \right\}$$

$$T_{OZ} = \frac{D}{J} rk_1\{s^2\beta_0(c\gamma_N c\epsilon_N - c\gamma_S c\epsilon_S) - \quad (3.2)$$

$$s\beta_0 c\beta_0[s\epsilon_N(1-c\gamma_N) - s\epsilon_S(1-c\gamma_S)] + c^2\beta_0(c\epsilon_N - c\epsilon_S)\} +$$

$$k_2 \left\{ \frac{D}{J} r(c\gamma_N - c\gamma_S) + \right.$$

$$\left. \frac{J}{G} r[c\beta_0(c\gamma_N c\epsilon_N - c\gamma_S c\epsilon_S) - s\beta_0(c\gamma_N s\epsilon_N - c\gamma_S s\epsilon_S)] \right\}$$

$$T_{OY} = -\frac{D}{J} rk_1[s\beta_0 c\beta_0(s\gamma_N c\epsilon_N - \quad (3.3)$$

$$s\gamma_S c\epsilon_S) + c^2\beta_0(s\gamma_N s\epsilon_N - s\gamma_S s\epsilon_S)] \equiv T_{PY}$$

In an abbreviated manner, in the equations (3.1)–(3.3), the trigonometric functions sin, cos are replaced by their first letters "s" and "c". For the configurations which are assumed to be symmetrical, the following simplifying terms were also introduced:

$$\left|\frac{J}{G}\tilde{r}_S\right| = \left|-\frac{J}{G}\tilde{r}_N\right| = \frac{J}{G}r \quad (3.4)$$

$$\left|\frac{D}{J}\tilde{r}_S\right| = \left|-\frac{D}{J}\tilde{r}_N\right| = \frac{D}{J}r$$

The representation of the torques ($T_{FX}$, $T_{FY}$, $T_{FZ}$) in the satellite-fixed system of coordinates ($X_F$, $Y_F$, $Z_F$) which rotates about the axis ($Y_F=Y_O$) which is orthogonal with respect to the orbiting plane at the orbiting speed of the satellite ($\omega_O$), according to $$\alpha_O = -\omega_O \cdot t$$

($\omega_O=7,27 \cdot 10^{-5}$ rad/sec in the case of geostationary satellites, is obtained by the transformation:

$$\begin{bmatrix} T_{FX} \\ T_{FY} \\ T_{FZ} \end{bmatrix} = \begin{bmatrix} c\alpha_O & 0 & s\alpha_O \\ 0 & 1 & 0 \\ -s\alpha_O & 0 & c\alpha_O \end{bmatrix} \begin{bmatrix} T_{OX} \\ T_{OY} \\ T_{OZ} \end{bmatrix} = \begin{bmatrix} T_{OX}c\alpha_O + T_{OZ}s\alpha_O \\ T_{OY} \\ -T_{OX}s\alpha_O + T_{OZ}c\alpha_O \end{bmatrix} \quad (4)$$

By means of the above physical relations, which are valid for the present invention without limitations, the multiple intervention possibilities ($\gamma$, $\epsilon$) for generating solar pressure torques and adjusting torques will now be indicated by means of several special cases.

In a first special case, the effect of the repeatedly mentioned windmill torques will be considered which are generated by the adjustment of the two solar generators in opposite directions about the conventional first axis of rotation 109, 110 by angles of equal amounts. In the case of an additional adjustment of the solar generators in the same direction also by values of equal amounts about the second axes of rotation 301, 302 corresponding to the conditions $$\gamma_N = -\gamma_S = \gamma_1$$

$$\epsilon_N = \epsilon_S = \epsilon \quad (5.1a)$$

the following relationships are obtained from the above-mentioned equations:

$$T_{OX} = 2s\gamma_1 \left\{ \frac{D}{J} r[k_2 + k_1 s\beta_0 s(\beta_0 + \epsilon)] + \frac{J}{G} rk_2 c(\beta_0 + \epsilon) \right\} \quad (5.1b)$$

$$T_{OZ} \equiv 0$$

$$T_{OY} = -2s\gamma_1 k_1 \frac{D}{J} rc\beta_0 s(\beta_0 + \epsilon)$$

Accordingly, in the present case, the windmill torque acts simultaneously about two axes ($X_O$, $Y_O$). In this case, the component about the axis ($Y_O$) which is orthogonal with respect to the orbiting plane, in contrast to the classic configuration, because of the different orientation of the normal to the surface, is a function of the elevation angle of the sun. However, the size and the preceding sign of the latter proportion may, in addition, be influenced by steering the solar generator movement about the second axes of rotation (equations 2.2), but only at the expense of the obtainable electric energy. In particular, this torque proportion for $\epsilon=-\beta_0$ will disappear, which corresponds to the classic orientation of the solar generators perpendicularly to the orbiting plane, or the torque acts in the opposite direction when the adjusting angle ($\epsilon$), with respect to the amount, is larger than the elevation angle of the sun ($\beta_0=\epsilon$) and is directed opposite to it. In the case of other adjustments of the solar generator alignment about the second axes of rotation, for example by the combination $$\gamma_N = -\gamma_S = \gamma_1$$

$$\epsilon_N = -\epsilon_S = \epsilon_1 \quad (5.1)$$

or $|\epsilon_N| \neq |\epsilon_S|$, solar pressure torques are generated about all three reference axes ($X_O$, $Y_O$, $Z_O$), whose size and preceding signals can easily be derived from the general equations (3.1)–(3.3) but are no longer as comprehensible.

A second simple special case is obtained for the combination of symmetrical adjustments in the same direction about the first axes of rotation (equation 2.1) and adjustments in the same and opposite directions about the second axes of rotation (equation 2.2). The former case with $$\gamma_N = \gamma_S = \gamma$$

$$\epsilon_N = \epsilon_S = \epsilon \quad (5.2a)$$

as well as the even more special case of no deviation at all with respect to the direction of the sun ($\gamma=\epsilon=0$) represents the trivial case of identically disappearing torques about all reference axes ($X_O$, $Y_O$, $Z_O$) which, although it is confirmed by the equations, deserves no special attention. In contrast, for the case of adjustments about the second axes of rotation in opposite directions, corresponding to $$\gamma_N = \gamma_S = \gamma$$

$$\epsilon_N = -\epsilon_S = \epsilon_1 \quad (5.2b)$$

the relationships $$T_{OX} = 2s\gamma s\epsilon_1 \left[ s\beta_0 \left( \frac{D}{J} rk_1 c\beta_0 - \frac{J}{G} rk_2 \right) \right] \quad (5.2c)$$

$$T_{OZ} = -2s\epsilon_1 s\beta_0 \left[ -c\gamma \left( \frac{D}{J} rk_1 c\beta_0 - \frac{J}{G} rk_2 \right) + \frac{D}{J} rk_1 c\beta_0 \right]$$

$$T_{OY} = -2s\gamma s\epsilon_1 \left[ \frac{D}{J} rk_1 c^2 \beta_0 \right]$$

are obtained, and particularly for $\gamma_N = \gamma_S = \gamma = 0$;

$$T_{OX} = T_{OY} \equiv 0 \quad (5.2d)$$

$$T_{OZ} = -\frac{J}{G} rk_2 s\beta_0 s\epsilon_1$$

This special case therefore permits the generating of independent torques ($T_{OZ}$) about that reference axis ($Z_O$) which cannot be controlled by way of windmill torques. However, the equation which applies to it (equation 5.2d) indicates a considerable dependence of the torque amount on the elevation angle of the sun ($\epsilon=\beta_0$). In the case of geostationary satellites, the respective multiplicative factor fluctuates between $-0.4 \leq \sin\beta_0 \leq +0.4$, and is therefore very suitable in the ranges of the highest solar altitude above and below the level of the equator (summer and winter solstice) but not in periods when the day and the night have the same length ($\beta_0=0$). However, this difficulty can easily be eliminated by adjusting the two solar generators about the second axes of rotation 301, 302 by unequal angles ($\epsilon_N \neq \epsilon_S$), as indicated by the generally valid relation (equation 3.2, $\gamma_N = \gamma_S = \gamma = 0$) for arbitrary values of $\epsilon_N$, $\epsilon_S$:

$$T_{OZ} = -(s\epsilon_N - s\epsilon_S)\frac{J}{g}rk_2s\beta_0 + (c\epsilon_N - c\epsilon_S)\left(\frac{D}{J}rk_1 + \frac{J}{G}rk_2c\beta_0\right) \quad (5.2e)$$

Even when the first contribution to the solar pressure torque disappears (because of $\beta_0=0$), by means of appropriate combinations, such as $$\epsilon_N \neq 0, \epsilon_S=0$$

$$\epsilon_N=0, \epsilon_S \neq 0$$

solar pressure torques of any preceding sign can be generated. Since the size of the torque changes with the adjusting angle because of the cosine dependence (in this case in an approximation of only the second order), larger deflections are required. However, this is not critical with respect to the energy yield because of the favorable position of the sun.

These simple special cases show that the present invention can basically be used for generating targeted solar pressure torques about three space axes individually or combined. In particular, for constant deflections ($\gamma$, $\epsilon$) of the solar generators from their nominal orientation ($\alpha_0$, $\beta_0$), these torques are also constant in the selected—apart from the slow migration of the plane of incidence of the sunlight because of the rotation of the earth around the sun—"quasi" space-fixed system of coordinates. The simple conditions of constant interfering torques in these coordinates, for the compensation of which one-time adjusting commands for the solar generators would also be sufficient, however, are hardly encountered in practice because of the initially mentioned different interfering influences. This will be demonstrated in the following for the example of typical interfering torque courses as may be created by solar pressure by way of deviations of the center of gravity because of constructional asymmetries or mission-caused migration of the center of gravity.

Figure 4:
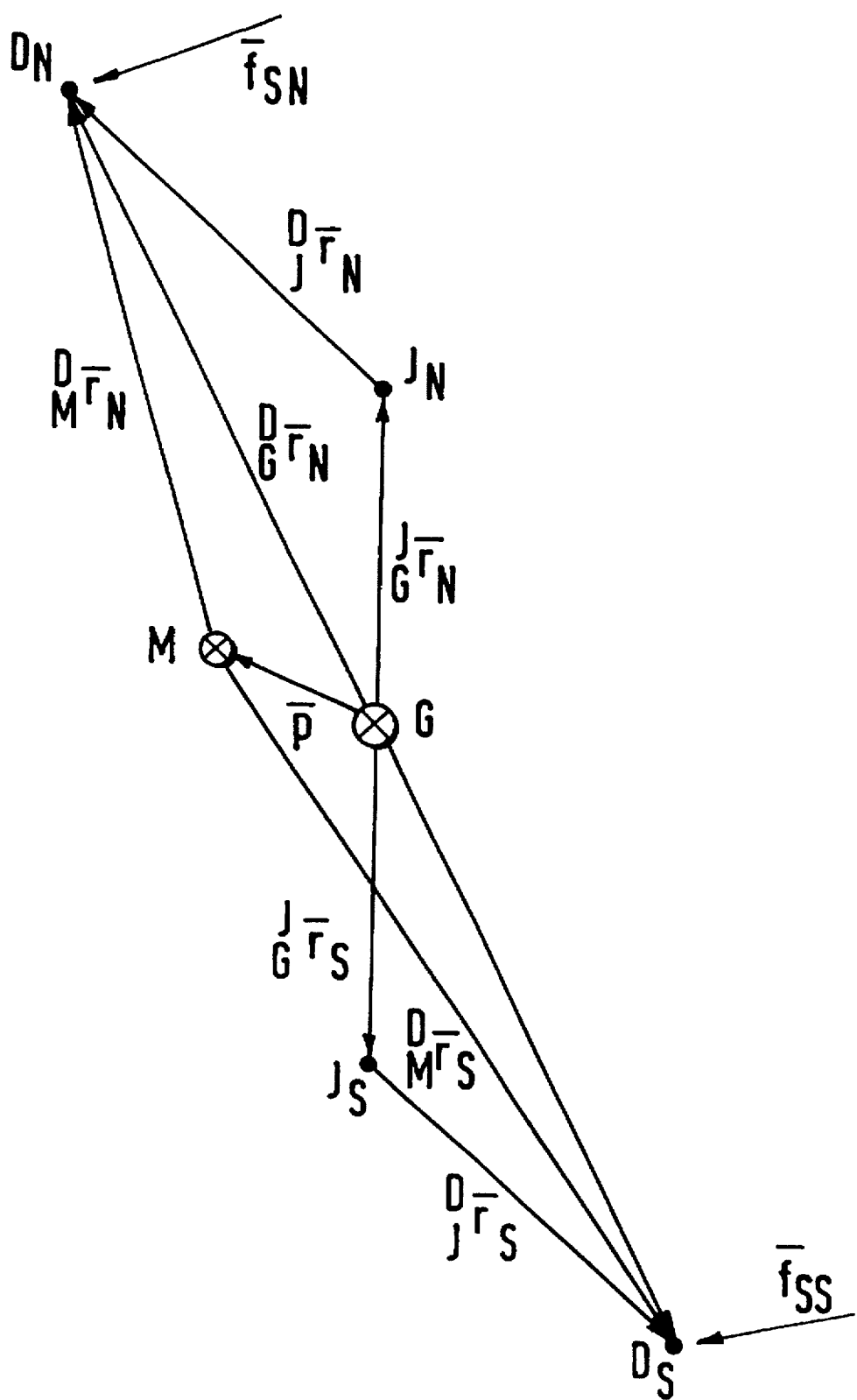
FIG. 4 is a schematic representation of a vector diagram for determining the interfering torques caused by solar pressure via deviations of the center of gravity.

FIG. 4 is used for illustrating the occurring conditions, where the vector diagram of the geometrical quantities $$\left(\frac{J}{G}r, \frac{D}{J}r, \frac{D}{G}r\right)$$

is again shown for the solar generator panel unit according to FIG. 3 arranged on the north side (Index "N") and on the south side (Index "S"). In addition, this diagram shows a shifting of the nominal center of gravity (G) by a deviation vector ($\bar{\rho}$) into a new position (M) as well as the vectors $$\left(\frac{D}{M}r_N, \frac{D}{M}r_S\right)$$

which connect this new center of gravity with the solar pressure points ($D_N$, $D_S$). There, the resulting solar pressure forces ($f_{SN}$, $f_{SS}$) are applied which, in the case of the nominal alignment of the solar generators, in a first approximation, are directed opposite the normal to the surface if the influence of the relatively small control movements ($\gamma$, $\epsilon$) about the normal orientation is not considered. Together with the deviations $|\bar{\rho}|$ of the center of gravity, which are also assumed to be small, these deviations furnish only small quantities which are of the second order. By means of these assumptions and terms, the interfering torques ($M_X$, $M_Y$, $M_Z$) in the space-fixed system of coordinates ($X_0$, $Y_0$, $Z_0$) which are caused by the deviations of the center of gravity by the radiation pressure of the sun on the solar generators, can be expressed as follows:

$$\begin{bmatrix} M_X \\ M_Y \\ M_Z \end{bmatrix} = 2(k_1 + k_2) \begin{bmatrix} -\rho_X s\alpha_0 s\beta_0 - \rho_Z c\alpha_0 s\beta_0 \\ \rho_X s\alpha_0 c\beta_0 + \rho_Z c\alpha_0 c\beta_0 \\ \rho_X c\alpha_0 s\beta_0 - \rho_Y c\beta_0 - \rho_Z s\alpha_0 s\beta_0 \end{bmatrix} \quad (6.1)$$

These relations show that the interfering torques change as a function of the direction of the axes of the displacement of the center of gravity ($\rho_X$, $\rho_Y$, $\rho_Z$) in contrast to the control torques (equations 3.1–3.3 or the discussed special cases) periodically with the angle of rotation of the main body of the satellite about its normal to the orbit ($\alpha_0$). Only in the case of a displacement of the center of gravity in the direction of the first axes ($\rho_Y$; $\rho_X=\rho_Z=0$) of rotation, a constant adjusting of the solar generators in opposite directions about their second axes of rotation by the angle $$\epsilon_N = -\epsilon_S = \epsilon_1 = \arcsin\left\{2 \cdot (1 + k_1/k_2) \cdot \left(\rho_Y \frac{J}{G}r\right) \cdot \text{ctg } \beta_0\right\} \quad (6.2)$$

will be sufficient, as obtained by equating the corresponding expressions for the control torque ($T_{OZ}$ according to equation 5.2d) with the corresponding term of the interfering torque ($M_Z$ according to equation 6.1). Therefore, in the present case, the compensation may take place in a simple manner by way of a solar generator adjustment about the second axis of rotation, and not, as in the classic case, as an average, only by way of windmill torques whose line of influence is always spatially offset by 90° with respect to the interfering torque. As the reference point for the amount of the required solar generator adjustment ($\epsilon_N=-\epsilon_S=\epsilon_1$), the numerical values of a real satellite, the EUTELSAT II, will be used as the basis. For this purpose, approximately the following parameter data will apply:

$$P = 4,5 \cdot 10^{-6} \text{ N/m}^2$$
$$C_s = 0,2$$
$$C_d = 0,06$$
$$A = 15 \text{ m}^2$$
$$\frac{J}{G}r = 2 \text{ m}$$
$$\frac{D}{J}r = 4,5 \text{ m}$$

and thus a required adjusting angle of $\epsilon_1=3,7°$ per cm of displacement ($\rho_Y$) of the center of gravity.

Analogously, by comparing physical relation of certain interfering influences (for example, equation 6) with those of the producible adjusting torques according to the invention (equation 3.1–3.3) in a general representation or corresponding to derived special cases (for example, equations 5.1–5.2), qualitative and quantitative information can be obtained concerning the structure of the control laws to be used and their effectiveness as well as the sensitivity to an intervention. Thus, the present example illustrates immediately that disturbances because of the displacement of the center of gravity in the $Y_0$-direction ($\rho_X=\rho_Z=0$), as mentioned initially, in the case of the classic configuration ($\beta_0=0$), are not at all influenced by windmill torques and such, which result from deviations of the center of gravity in the $X_0$-direction, ($\rho_Y=\rho_Z=0$) can be compensated simultaneously by means of the method according to the invention because of their favorable correlation in two axes ($X_0$, $Y_0$) (compare equation 6 and 5.1b). However, a person skilled in the art is familiar with such considerations, and these considerations therefore do not have to be described here in greater detail.

Because of the above mentioned plurality of interfering influences and their superposition which finally contain constant proportions about all axes of the satellite, simply with the orbiting frequency periodic and high harmonics of the interfering torques which, in addition, are also subjected to seasonal fluctuations, it is, however, expedient in practice to optimize the use of the intervention possibilities offered by the invention while taking into account specific marginal conditions. For every spacecraft, particularly for communication and application satellites, interfering torque calculations are carried out in the development phase while taking into account the geometrical configuration, constructional tolerances and surface characteristics, their mission profile and their environmental conditions, which calculations are generally used as the basis of the design of an adjusting system.

According to a further development of the idea of the invention, it is therefore suggested to determine, by means of optimization programs known to the person skilled in the art and by means of electronic computer systems, the most favorable and most effective combination of the available intervention possibilities ($\gamma_N$, $\gamma_S$, $\gamma_N$, $\gamma_S$) for adjusting the position and/or compensating interference quantities for the respective application while using the generally valid precise regularities (equations 3.1–3.3) and taking into account the corresponding marginal conditions. Boundary conditions, in this case, are not only the interfering torque profiles for individual or several satellite axes or space axes but, for example, also limitations of interfering quantities, specific characteristics of the adjusting system, such as the presence of momentum storage devices and other actuators as well as the available altitude information. The advance of knowledge of the interfering influences may possibly also be improved by measurements during the pre-operational effective phase and may be used for the later optimization and parameter adaptation by way of ground commands. Suitable optimization programs are described, for example, in "Optimization Theory of Large Systems" by Leon S. Lasdon, McMillan Company, approximately Page 11, Powell's Method. In a known manner, such optimization processes are based on scalar cost functional whose minimum is determined as a function of the free adjusting parameters ($\gamma$, $\epsilon$).

Although the present invention in principle, while using as input quantities for the controlling device measured values of the satellite position, possibly of speeds and time functions, permits the direct adjusting of the satellite alignment with respect to the mission-caused desired orientation, for example, with respect to the earth, the exclusive utilization of the solar generator adjustment for generating adjusting torques will not be sufficient for a satisfactory solution of the adjusting task. This is because, among others, after orbit correcting maneuvers, for whose implementation reaction nozzles are required with a relatively high thrust level and torque level, considerable rotatory residual speeds occur about the individual satellite axes, for the control of which, by means of the comparatively weak solar pressure torques, unacceptably long transition times would be required before the desired alignment is reached. And, during the passage through the shadow of the earth, solar-pressure dependent torques could disappear completely and remaining interfering influences and residual speeds could no longer be controlled.

Figure 5:
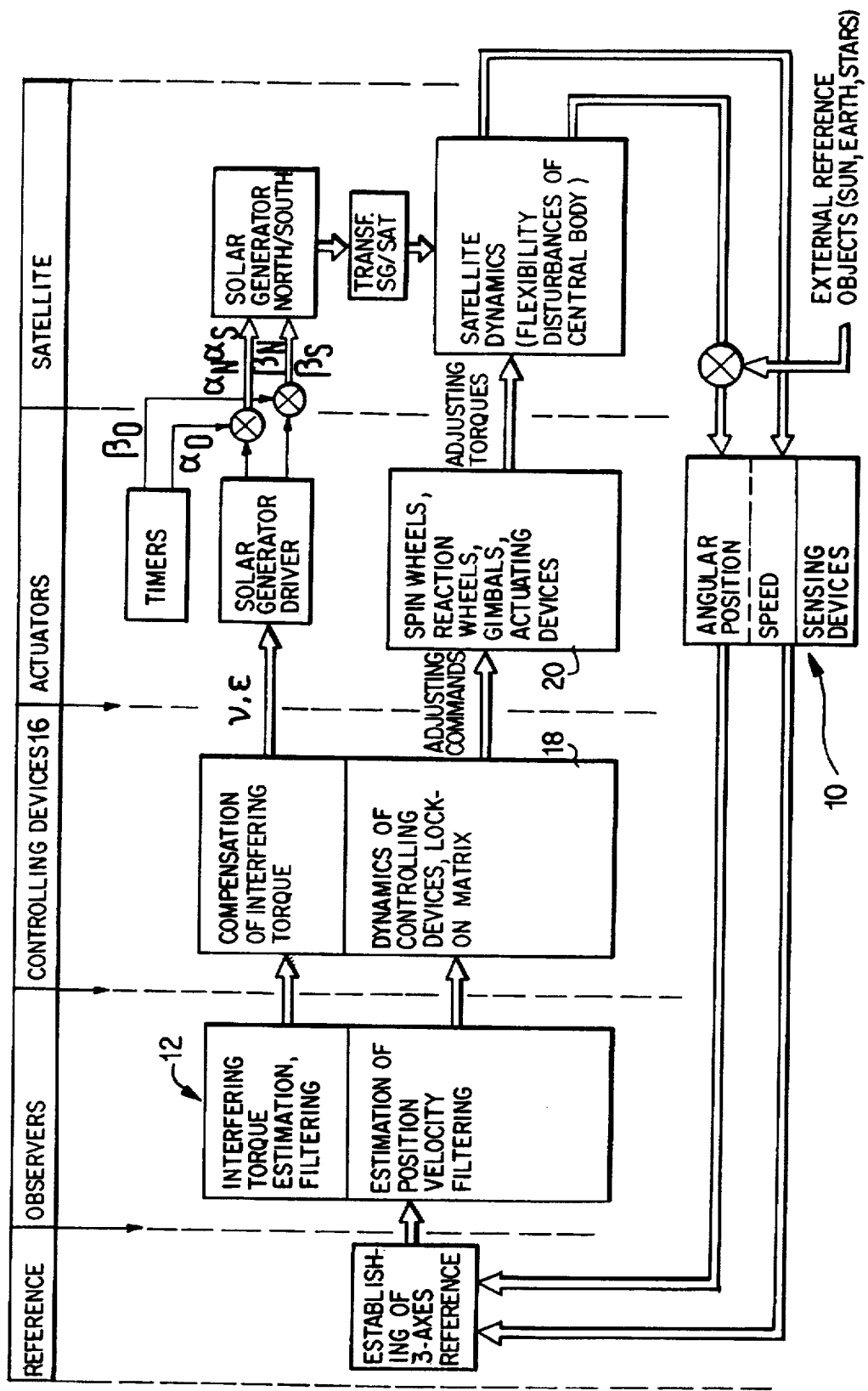
FIG. 5 is a block diagram of a position adjusting system using the present invention.

By means of the schematic representation of the adjusting system according to FIG. 5, several examples of applications of the present invention are to be explained in greater detail. In a general form, the block diagram shows a typical adjusting system for satellites. The actual angular position about the roll, pitch and yaw axis ($\phi$, $\theta$ possibly, $\psi$) with respect to external reference objects, such as the earth, the sun, the stars and possibly also the angular velocity ($\omega_X$, $\omega_Y$, $\omega_Z$), according to the application or the operational effective phase, is determined by sensing elements 10. By the suitable combination of the measured values in a corresponding electronic system, such as a digital on-board computer, a position reference is established. By using filtering and estimating methods 12, suitable information is obtained concerning the momentary "system condition" of the satellite which in the present case is to be characterized by the position, the speed and the interfering torques. The splitting-off of the interfering torque proportions representation of observers 14 and controlling devices 16 of FIG. 5 has the purpose of illustrating the compensating of interfering torques byway of the adjusting drives of the solar generators according to the introduced relationships (equations 2.1–2.2a, b). In parallel, adjusting commands are emitted from the controlling device 18 to the classic fast-reacting actuators 20 which ensure the stability and the precise position, such as spin wheels, gimbals, reaction wheels and/or reaction actuating devices which are present depending on the requirement-specific equipment of the adjusting system or which are active at the time depending on the operational effective phase. There is the possibility of mounting simple additional two-axes sun sensors on the solar generators which may be used for the automatic readjustment of the normal to the solar generators into the commanded direction and which make a timer largely unnecessary. The shifting of the solar pressure torques generated in space-fixed axes ($X_0$, $X_0$, $Z_0$) by the solar generators into the vehicle coordinates ($X_F$, $Y_F$, $Z_F$) in which normally the satellite orientation is measured and the other adjusting torques are generated, is also schematically illustrated in FIG. 5.

As known, many currently operational communication satellites work in the normal effective phase with infrared earth sensors as sensing devices for determining the deviation during rolling and pitching (FIG. 1); with fixedly installed spin wheels for generating adjusting torques about the pitch axis; with reaction nozzles which generate rolling torques and which, at the same time, have a torque component about the yaw axis; as well as other reaction nozzles for the discharge of interfering pitch torques accumulated in the spin wheel. The positional accuracy about the yaw axis pointing to earth is determined by the spin rigidity and the size of the interfering torque acting about this satellite axis. When the present invention is used, the above-mentioned optimal adjusting strategy for the best-possible compensating of interfering torques may be determined. This strategy may be determined, for example, more meaningfully by the determination of such adjusting variables ($\gamma_N$, $\gamma_S$, $\epsilon_N$, $\epsilon_S$) about the desired orientation of the solar generators which make a function (J) of the following form to a minimum $$J = \left\{ g_1(M_Z - T_Z)^2 + g_2 \int_0^{2\pi} (M_Y - T_Y) d(\omega_0 t) \right\}$$

wherein $M_Z$, $M_Y$ are the interfering torques about the satellite axes ($Z_F$, $Y_F$)

$T_Z$, $T_Y$ are the solar pressure torques (equations 3.2, 3.3); and $g_1$, $g_2$ are constant or time-dependent weight factors.

By means of the square dependence of the cost function from the residual error (difference) of the torque balance about the $Z_{F\text{-}axis}$, large deviations are evaluated more strictly than small deviations. Whereas, for the $Y_F(=Y_O)$-axis, because of the spin storage capacity, the torque balance must be compensated only as an average along an orbit. In the effective operation, the thus determined most effective adjusting variables (and combinations) will then be controlled as a function of the interfering torques and deviations and, if these cannot be measured, by way of their estimated values. These types of considerations may also be applied to satellites which are equipped with different actuators depending on whether they have the momentum storage capacity about the respective satellite axes.

The application spectrum of the present invention is not limited to the examples used for the purpose of an explanation, but all common measures relative to measuring techniques and estimating processes may be used for obtaining the best-possible information concerning the variables characterizing the satellite and all possibilities with respect to adjusting techniques, such as adaptive controlling devices, reoptimization on board or by way of the ground. Furthermore, the possibilities offered by the invention may be used wherever the prerequisites exist for the validity of the described interrelationships and relations. In particular, aerodynamic surface forces in thin air layers follow the same relations (equation 1.1) which permits, for example, the application of the invention in the case of satellites and other flying objects on low orbits around the earth (approximately 150–300 km) or, in the case of geostationary satellites, on their transfer path in the environment of the perigee passage while utilizing the forces and torques generated by air molecules instead of solar pressure.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A method for adjusting an orientation of a satellite moving on an orbit around the earth, the orbit having an orbiting plane, and for compensating interfering torques via solar pressure torques for the satellite, said satellite having two solar generators (104, 105), having active surfaces, arranged symmetrically on opposite sides of a main body of said satellite, said two solar generators being rotatable independently of one another via servomotors about a first axis (109, 110) of rotation coinciding with a pitch axis ($Y_F$) of a satellite-fixed system of axes ($X_F$, $Y_F$, $Z_F$) which pitch axis is orthogonal to the orbiting plane of the satellite for a nominal orientation of the satellite, the method comprising the steps of:

nominally orienting ($\alpha_0$, $\beta_0$) the solar generators by rotation about at least one of said first axis of rotation ($\alpha_0$) and a second axes of rotation such that normals ($X_{PN}$, $X_{PS}$) to their active surfaces align precisely in a direction of a sun;

adjusting the solar generators via a targeted rotation ($\epsilon_N$, $\epsilon_S$, $\gamma_N$, $\gamma_S$) about either said second axes (301, 302) of rotation $\beta_0$, or said first and second axes of rotation, so as to selectively generate solar pressure torques ($T_{OX}$, $T_{OY}$, $T_Z$) about at least one of three space axes ($X_O$, $Y_O$, $Z_O$) oriented orthogonally with respect to one another forming a coordinate system in which the first space axis ($X_O$) is in a plane of incidence of the sunlight.

2. A method according to claim 1, wherein solar pressure torques about said first and second space axes are generated by an adjustment of said two solar generators in opposite directions about their first axes of rotation and an adjustment in the same direction about their second axes of rotation according to the rule:

$$T_{OX} = 2s\gamma_1 \left\{ \frac{D}{J} r[k_2 + k_1 s\beta_0 s(\beta_0 + \epsilon)] + k_2 \frac{J}{G} rc(\beta_0 + \epsilon) \right\}$$

$$T_{OY} = -2s\gamma_1 k_1 \frac{D}{J} rc\beta_0 s(\beta_0 + \epsilon)$$

wherein c and s are the cos and the sin, $\beta_0$ is the angle of incidence of the sunlight with respect to the orbiting plane viewed from the satellite, $k_1$ and $k_2$ are quantities which are a function of the solar pressure as well as of surface characteristics and the geometry of the solar generators and are constant in the first approximation, and $$\frac{D_r}{J} \text{ and } \frac{J_r}{G}$$

are the distances from a solar pressure point D of a solar generator to the point of intersection J of the first and second axes of rotation and of the latter to a center of gravity G of the satellite.

3. A method according to claim 1, wherein solar pressure torques about said third space axes are generated by an adjustment of the two solar generators in opposite directions about their second axes of rotation according to the rule:

$$T_{OZ} = -2s\epsilon_1 k_2 \frac{J}{G} rs\beta_0.$$

4. A method according to claim 1, wherein the adjustments of said two solar generators about their first and second axes of rotation are optimized by computer program means which make an optimization criterion to a minimum in the form of:

$$J = \underset{(\gamma_N, \gamma_S, \epsilon_N, \epsilon_S)}{\text{Minimum}} g_2 \int_0^{2\pi} (M_Y - T_Y) d(\omega_0 t)$$

for satellite axes whose influencing additional actuators are used which contain angular momentum storage capacity, $M_Y$, $M_Z$ being precalculated interfering torque courses which are at least one of measured and obtained by way of estimating algorithms and act about respective satellite axes (Y, Z), $T_Y$, $T_Z$ being solar pressure torques which can be generated by adjustments ($\gamma_N$, $\gamma_S$, $\epsilon_N$, $\epsilon_S$) of the solar generators about their axes of rotation, and $g_1$, $g_2$ are one of constant and time-dependent weight factors.

5. A method according to claim 2, wherein the adjustments of said two solar generators about their first and second axes of rotation are optimized by computer program means which make an optimization criterion to a minimum in the form of:

$$J = \underset{(\gamma_N, \gamma_S, \epsilon_N, \epsilon_S)}{\text{Minimum}} g_2 \int_0^{2\pi} (M_Y - T_Y) d(\omega_0 t)$$

for satellite axes whose influencing additional actuators are used which contain spin storage capacity, $M_Y$, $M_Z$ being precalculated interfering torque courses which are at least one of measured and obtained by way of estimating algorithms and act about respective satellite axes (Y, Z), $T_Y$, $T_Z$ being solar pressure torques which are generated by adjustments ($\gamma_N$, $\gamma_S$, $\epsilon_N$, $\epsilon_S$) of the solar generators about their axes of rotation, and $g_1$, $g_2$ are one of constant and time-dependent weight factors.

6. A method according to claim 3, wherein the adjustments of said two solar generators about their first and second axes of rotation are optimized by computer program means which make an optimization criterion to a minimum in the form of:

$$J = \underset{(\gamma_N,\gamma_S,\epsilon_N,\epsilon_S)}{\text{Minimum}} \; g_2 \int_0^{2\pi} (M_Y - T_Y) d(\omega_0 t)$$

for satellite axes whose influencing additional actuators are used which contain spin storage capacity, $M_Y$, $M_Z$ being precalculated interfering torque courses which are at least one of measured and obtained by way of estimating algorithms and act about respective satellite axes (Y, Z), $T_Y$, $T_Z$ being solar pressure torques which are generated by adjustments ($\gamma_N$, $\gamma_S$, $\epsilon_N$, $\epsilon_S$) of the solar generators about their axes of rotation, and $g_1$, $g_2$ are one of constant and time-dependent weight factors.

7. A method according to claim 1, wherein solar pressure torques about third space axes are generated by an adjustment of only one of said two solar generators according to the rule:

$$T_{0Z} = -(s\epsilon_N - s\epsilon_S) k_2 \frac{J}{G} r s \beta_0 + (c\epsilon_N - c\epsilon_S) \left( k_1 \frac{D}{J} r + k_2 \frac{J}{G} r c \beta_0 \right).$$

8. A method according to claim 1, wherein the adjustments of said two solar generators about their first and second axes of rotation are optimized by computer program means which make an optimization criterion to a minimum in the form of:

$$J = \underset{(\gamma_N,\gamma_S,\epsilon_N,\epsilon_S)}{\text{Minimum}} \; g_2 \int_0^{2\pi} (M_Y - T_Y) d(\omega_0 t)$$

for satellite axes whose influencing additional actuators are used which contain angular momentum storage capacity, and the form of:

$$J = \underset{(\gamma_N,\gamma_S,\epsilon_N,\epsilon_S)}{\text{Minimum}} \; \{g_1(M_Z - T_Z)^2\}$$

for satellites whose influencing additional actuators are available without momentum storage capacity, $M_Y$, $M_Z$ being precalculated interfering torque courses which are at least one of measured and obtained by way of estimating algorithms and act about respective satellite axes (Y, Z), $T_Y$, $T_Z$ being solar pressure torques which can be generated by adjustments ($\gamma_N$, $\gamma_S$, $\epsilon_N$, $\epsilon_S$) of the solar generators about their axes of rotation, and $g_1$, $g_2$ are one of constant and time-dependent weight factors.

9. A method according to claim 1, wherein the adjustments of said two solar generators about their first and second axes of rotation are optimized by computer program means which make an optimization criterion to a minimum in the form of:

$$J = \underset{(\gamma_N,\gamma_S,\epsilon_N,\epsilon_S)}{\text{Minimum}} \; \{g_1(M_Z - T_Z)^2\}$$

for satellites whose influencing additional actuators are available without momentum storage capacity, $M_Y$, $M_Z$ being precalculated interfering torque courses which are at least one of measured and obtained by way of estimating algorithms and act about respective satellite axes (Y, Z), $T_Y$, $T_Z$ being solar pressure torques which can be generated by adjustments ($\gamma_N$, $\gamma_S$, $\epsilon_N$, $\epsilon_S$) of the solar generators about their axes of rotation, and $g_1$, $g_2$ are one of constant and time-dependent weight factors.

10. A method according to claim 2, wherein the adjustments of said two solar generators about their first and second axes of rotation are optimized by computer program means which make an optimization criterion to a minimum in the form of:

$$J = \underset{(\gamma_N,\gamma_S,\epsilon_N,\epsilon_S)}{\text{Minimum}} \; g_2 \int_0^{2\pi} (M_Y - T_Y) d(\omega_0 t)$$

for satellite axes whose influencing additional actuators are used which contain spin storage capacity, and the form of:

$$J = \underset{(\gamma_N,\gamma_S,\epsilon_N,\epsilon_S)}{\text{Minimum}} \; \{g_1(M_Z - T_Z)^2\}$$

for satellites whose influencing additional actuators are available without spin storage capacity, $M_Y$, $M_Z$ being precalculated interfering torque courses which are at least one of measured and obtained by way of estimating algorithms and act about respective satellite axes (Y, Z), $T_Y$, $T_Z$ being solar pressure torques which are generated by adjustments ($\gamma_N$, $\gamma_S$, $\epsilon_N$, $\epsilon_S$) of the solar generators about their axes of rotation, and $g_1$, $g_2$ are one of constant and time-dependent weight factors.

11. A method according to claim 2, wherein the adjustments of said two solar generators about their first and second axes of rotation are optimized by computer program means which make an optimization criterion to a minimum in the form of:

$$J = \underset{(\gamma_N,\gamma_S,\epsilon_N,\epsilon_S)}{\text{Minimum}} \; \{g_1(M_Z - T_Z)^2\}$$

for satellites whose influencing additional actuators are available without spin storage capacity, $M_Y$, $M_Z$ being precalculated interfering torque courses which are at least one of measured and obtained by way of estimating algorithms and act about respective satellite axes (Y, Z), $T_Y$, $T_Z$ being solar pressure torques which are generated by adjustments ($\gamma_N$, $\gamma_S$, $\epsilon_N$, $\epsilon_S$) of the solar generators about their axes of rotation, and $g_1$, $g_2$ are one of constant and time-dependent weight factors.

12. A method according to claim 3, wherein the adjustments of said two solar generators about their first and second axes of rotation are optimized by computer program means which make an optimization criterion to a minimum in the form of:

$$J = \underset{(\gamma_N,\gamma_S,\epsilon_N,\epsilon_S)}{\text{Minimum}} \; g_2 \int_0^{2\pi} (M_Y - T_Y) d(\omega_0 t)$$

for satellite axes whose influencing additional actuators are used which contain spin storage capacity, and the form of:

$$J = \underset{(\gamma_N,\gamma_S,\epsilon_N,\epsilon_S)}{\text{Minimum}} \; \{g_1(M_Z - T_Z)^2\}$$

for satellites whose influencing additional actuators are available without spin storage capacity, $M_Y$, $M_Z$ being precalculated interfering torque courses which are at least one of measured and obtained by way of estimating algorithms and act about respective satellite axes (Y, Z), $T_Y$, $T_Z$ being solar pressure torques which are generated by adjustments ($\gamma_N$, $\gamma_S$, $\epsilon_N$, $\epsilon_S$) of the solar generators about their axes of rotation, and $g_1$, $g_2$ are one of constant and time-dependent weight factors.

13. A method according to claim 3, wherein the adjustments of said-two solar generators about their first and second axes of rotation are optimized by computer program means which make an optimization criterion to a minimum in the form of:

$$J = \underset{(\gamma_N, \gamma_S, \epsilon_N, \epsilon_S)}{\text{Minimum}} \{g_1(M_Z - T_Z)^2\}$$

for satellites whose influencing additional actuators are available without spin storage capacity, $M_Y$, $M_Z$ being precalculated interfering torque courses which are at least one of measured and obtained by way of estimating algorithms and act about respective satellite axes (Y, Z), $T_Y$, $T_Z$ being solar pressure torques which are generated by adjustments ($\gamma_N$, $\gamma_S$, $\epsilon_N$, $\epsilon_S$) of the solar generators about their axes of rotation, and $g_1$, $g_2$ are one of constant and time-dependent weight factors.

\* \* \* \* \*